L. WOODWORTH.
INTERNAL COMBUSTION ENGINE.
APPLICATION FILED MAY 17, 1911.
1,032,171.
Patented July 9, 1912.
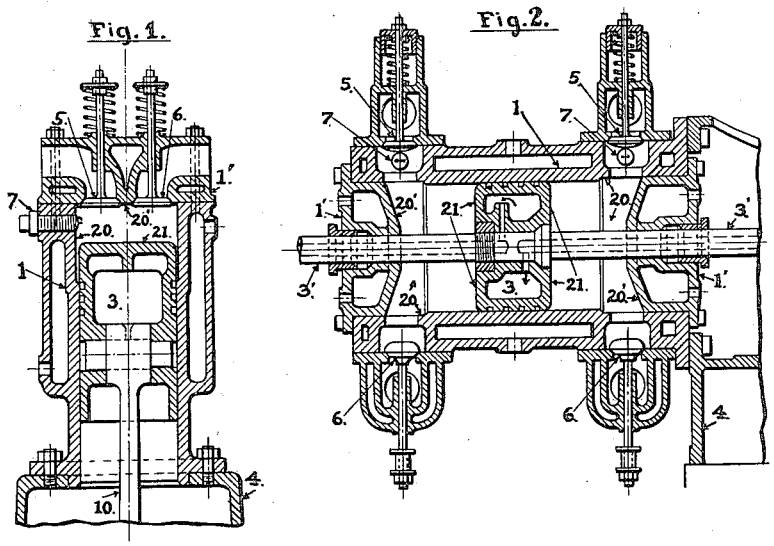
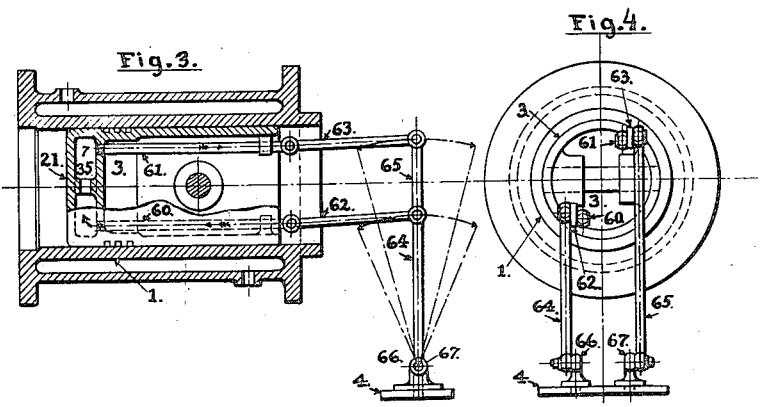
Witnesses:
Inventor:

UNITED STATES PATENT OFFICE.

LYMAN WOODWORTH, OF SAN FRANCISCO, CALIFORNIA.

INTERNAL-COMBUSTION ENGINE.

1,032,171.	Specification of Letters Patent.	Patented July 9, 1912.

Application filed May 17, 1911. Serial No. 627,823.

*To all whom it may concern:*

Be it known that I, LYMAN WOODWORTH, a citizen of the United States, residing at San Francisco, in the county of San Francisco and State of California, have invented certain new and useful Improvements in Internal-Combustion Engines, of which the following is a specification.

This invention relates to internal-combustion motor engines, more commonly called gas-engines, oil-engines, or alcohol-motors, in which any suitable combustible material with or without water, is burned with air, the heated-air and products-of-combustion serving as the working-fluid of the engine.

The object of the present invention is to increase the efficiency of internal-combustion engine by the application of interior-coatings or linings to the parts or surfaces which serve to confine the hot gases of combustion of the engine, after the mode and function set forth in my prior application for patent for improvements in gas or oil engines having non-corrodible speculum metallic interior surfaces, filed in the United States Patent Office the tenth day of November in the year nineteen hundred and nine, Serial Number 527,197, the present invention being in the nature of a modification or variation of the prior invention.

My invention consists in certain improvements in the combustion-chambers, cylinders, cylinder-heads, and pistons of internal-combustion engines and in certain combinations of parts with coatings or linings of metallic material as tin or tin composition fixed in place by fusion or heat to the interior surfaces thereof, confining the hot working-fluid of the engine, as will be more fully hereinafter described in connection with the accompanying drawings, and defined by the claims.

As an example of one form of construction, Figure 1 shows a longitudinal section of the cylinder, combustion-chamber, cylinder-head, and piston of an internal-combustion engine containing my improvements. Fig. 2 shows a longitudinal section of the cylinder, cylinder-heads, and piston of a double-acting gas engine with my improvements. Fig. 3 shows a side elevation, partly in section, of a water cooled gas engine piston with my improvements. Fig. 4 is an end elevation of the parts shown in Fig. 3.

Referring to Fig. 1, the suitably cooled cylinder 1 mounted upon the frame 4 of the engine, a portion only of which frame is shown for simplicity, is provided with the cylinder-head 1' and the piston 3. The suitably cooled cylinder-head 1', in which the valves 5, 6, for admission and exhaust respectively are preferably placed, may, when not cast integral with the cylindrical portion of the combustion chamber, be secured in position by fastenings as shown. Both the cylinder 1 and cylinder-head 1' are preferably cooled by means of the circulation of water or other cooling-fluid in a jacket or passage about the heat exposed portions thereof. The piston 3 is mechanically connected to the engine crank-shaft not shown, as is well understood. The combustion space end of the cylinder 1 is best made in caliber sufficient to be clear of frictional contact by the piston 3. The ignition of air and fuel in the engine may be effected by an electric igniter 7, or by other suitable means well known.

The compression space end of the cylinder 1, the inner face of the cylinder-head 1', and the face of the piston 3 that serve to form the combustion-chamber, or the interior metallic walls for confining the hot working-fluid of the engine, are furnished with the linings 20, 20', and 21 respectively of tin or tin-composition secured in place by fusion or heat to the said parts, as will be more fully hereinafter described.

In Fig. 2 is shown sufficient of a double-acting gas-engine to illustrate the connection of my invention therewith. The several heat-exposed parts are provided with suitable means for cooling, as by the circulation of cooling-fluid or water, in the usual manner. The interior surfaces 20, 20' of the walls of the combustion spaces at the two ends of the cylinder 1, and the two ends or faces 21 of the piston 3 are coated with tin or tin-alloy secured in place by fusion or heat to the said parts.

In Figs. 3 and 4 the single-acting piston 3 is provided with a chamber or passage 35 in its heat exposed portion, and fitted with suitable piping, 60 to 67 inclusive, for the circulation of cooling-fluid or water in well known manner. The face of this fluid-cooled piston is furnished with the coating or covering 21 of tin or tin-alloy fused to the said parts by heat.

The several parts of the engine that are to be coated or lined with tin or tin-alloy, are best made smooth, clean, and bright by cutting or grinding and then heated in a muffle-furnace or oven to a temperature slightly above the melting point of the said coating-material; but not to an excessive temperature that might damage the material. In the case that pure tin is used for these coatings or linings, the temperature of the parts should be raised to a point slightly above 232. degrees centigrade, or 450. degrees Fahrenheit. The hot parts are then removed from the oven or furnace and the surfaces to be coated preferably wiped off with a swab wet with dilute hydrochloric acid, and then dusted over with granulated tin and resin, which tin fuses over the hot surfaces and is rubbed down to a smooth even coating with a swab or burnisher and then allowed to cool. Or, when the parts are of convenient size and shape, they may be dipped into molten tin and wiped over with a swab or burnisher. Instead of using pure tin for these fused-on coatings to the engine, compositions of tin and antimony, copper, nickel, cobalt, or aluminum may be used. I prefer for these purposes a composition of tin and nickel containing from five to ten per cent. of nickel; but I do not limit myself to this composition.

Having described my invention, I claim:—

1. The combination, in an internal-combustion engine, of a suitably cooled combustion-chamber and linings of fused-on metallic-material as tin to the interior surfaces thereof confining the hot working-fluid of the engine, substantially as shown and described.

2. The combination, in an internal-combustion engine, of a suitably cooled cylinder and linings of fused-on metallic-material as tin to the interior surfaces thereof not in frictional contact with the piston, substantially as shown and described.

3. The combination, in an internal-combustion engine, of a suitably cooled cylinder-head and linings or coatings of fused-on metallic-material as tin to the inner face thereof confining the hot working-fluid of the engine, substantially as shown and described.

4. The combination, in an internal-combustion engine, of a suitably cooled piston and coatings or facings of fused-on metallic-material as tin to the face or faces thereof confining the hot working-fluid of the engine, substantially as shown and described.

Signed at New York, State of New York, this 21st day of April 1911.

LYMAN WOODWORTH.

Witnesses:
A. L. WOODWORTH,
L. O. LYMAN.